D. S. RAMELLI.
PIPE FITTING.
APPLICATION FILED FEB. 26, 1909.

963,248.

Patented July 5, 1910.

WITNESSES
C. K. Davis
Myron J. Clear

Daniel S. Ramelli
INVENTOR
By C. L. Parker
Attorney

UNITED STATES PATENT OFFICE.

DANIEL S. RAMELLI, OF NEW ORLEANS, LOUISIANA.

PIPE-FITTING.

963,248.  Specification of Letters Patent.  Patented July 5, 1910.

Application filed February 26, 1909. Serial No. 480,210.

*To all whom it may concern:*

Be it known that I, DANIEL S. RAMELLI, citizen of the United States, residing at New Orleans, in the parish of Orleans and State of Louisiana, have invented certain new and useful Improvements in Pipe-Fittings, of which the following is a specification.

My invention relates to fittings for gas, water and other character of pipe, and more particularly to a fitting for tapping rigidly supported sections of such pipe, the idea of which may be embodied in a coupling or union.

Figure 1:
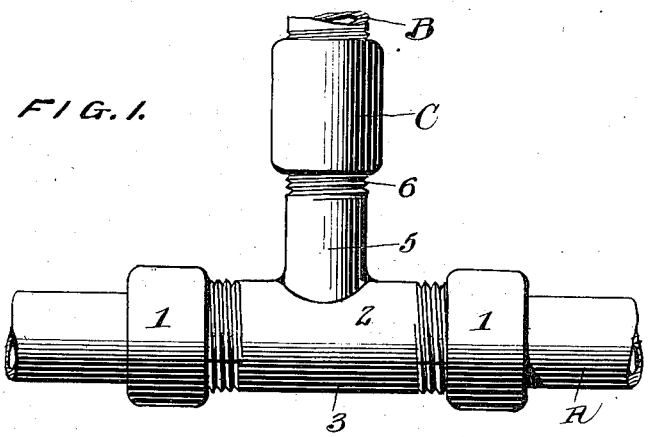
Figure 2:
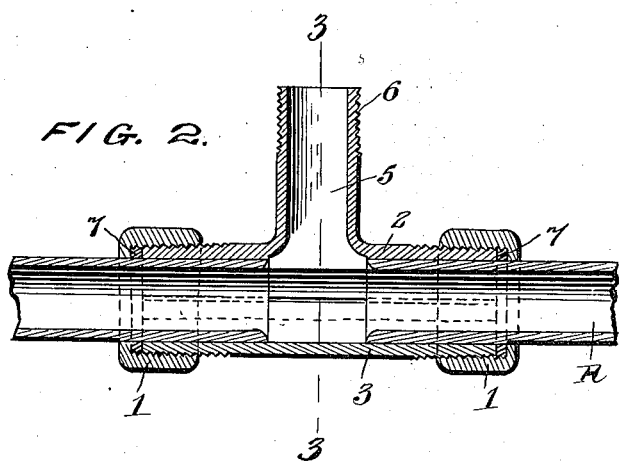
Figure 3:
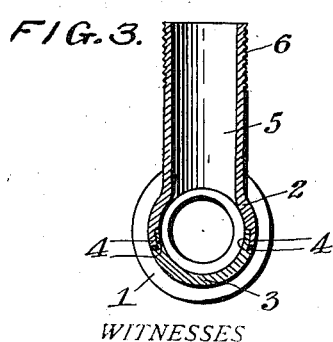

In the accompanying drawings, which illustrate my invention in both its embodiments, Figure 1 is a side elevation of my improved fitting, illustrating the same in its operative position. Fig. 2 is a central longitudinal sectional view taken therethrough. Fig. 3 is a central transverse sectional view taken therethrough on the line 3—3 of Fig. 2, and, Fig. 4 is a central longitudinal sectional view through an embodiment of my idea in the form of a coupling or union.

In the embodiment of my invention as shown in Figs. 1 to 3 inclusive, I cut out a section as shown in the rigidly supported pipe A, of sufficient width to admit of the insertion of gasket nuts 1, upon each portion of the pipe at the sides of said cut out section. The top fitting comprises a pair of semi-cylindrical sections 2 and 3, surrounding the pipe A and spanning its said cut out portion, and provided with reduced longitudinal edges 4, interfitting one another as clearly shown in Fig. 3, to provide a sliding joint for the expansion and contraction of said sections. Centrally of its end, the section 2 is provided with a tubular extension 5 projecting at right angles thereto, thus communicating with the interior of pipe A, and provided with an externally threaded end 6, for ready connection with a suitable pipe B by means of the ordinary sleeve coupling C. The ends of the sections 2 and 3 surrounding the pipe A, are tapered and threaded as shown, and when together form means for the engagement of the gasket nuts 1, adapted to be screwed thereon to contract the same about, and cause the same to readily grip, the pipe A, a packing ring 7, being disposed between the gasket nut 1, and the ends of the sections 2 and 3, as shown, to prevent a possible leak.

Figure 4:
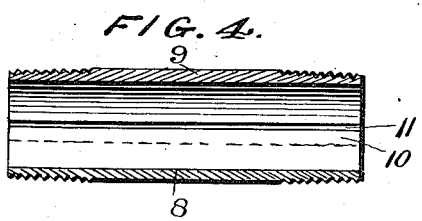

From the foregoing, it will be readily seen that my idea may be embodied in an ordinary coupling or union shown in Fig. 4, in which the sections 8 and 9 have reduced interfitting and overlapping edges 10 and 11 respectively, similar to the edges 4 of the sections 2 and 3 of the forms shown in Figs. 1 to 3. Gasket nuts of the form shown in connection with Figs. 1 and 3, are of course, employed with the forms shown in Fig. 4 to cause the sections 8 and 9 to contract and securely grip the pipe sections adjacent the ends thereof, between which, said sections extend.

It will thus be seen that the fitting and union which I have shown as the embodiment of my idea, will have especial advantages of use under many conditions common to the pipe transmission of gas, water and steam, as will be readily recognized by those skilled in these arts, and especially in tapping and connecting ends of pipes which are rigidly supported to an extent precluding of their sidewise movement.

Having fully described my invention, I claim:

A pipe coupling of the character described, comprising a longitudinal tubular body portion and a branch pipe arranged thereon at substantially right angles thereto, said body portion comprising semi-cylindrical sections upon one of which said branch pipe is arranged, one of said sections having longitudinal edges provided with continuous recesses upon the inner sides thereof, and the other of said sections being provided with continuous recesses upon the outer sides thereof, caps adapted for engagement with the ends of said body portion, and washers arranged within said caps, substantially as described.

In testimony whereof I affix my signature in presence of two witnesses.

DANIEL S. RAMELLI.

Witnesses:
A. A. CRAIN,
D. F. BYRNE.